United States Patent Office 3,383,917
Patented May 21, 1968

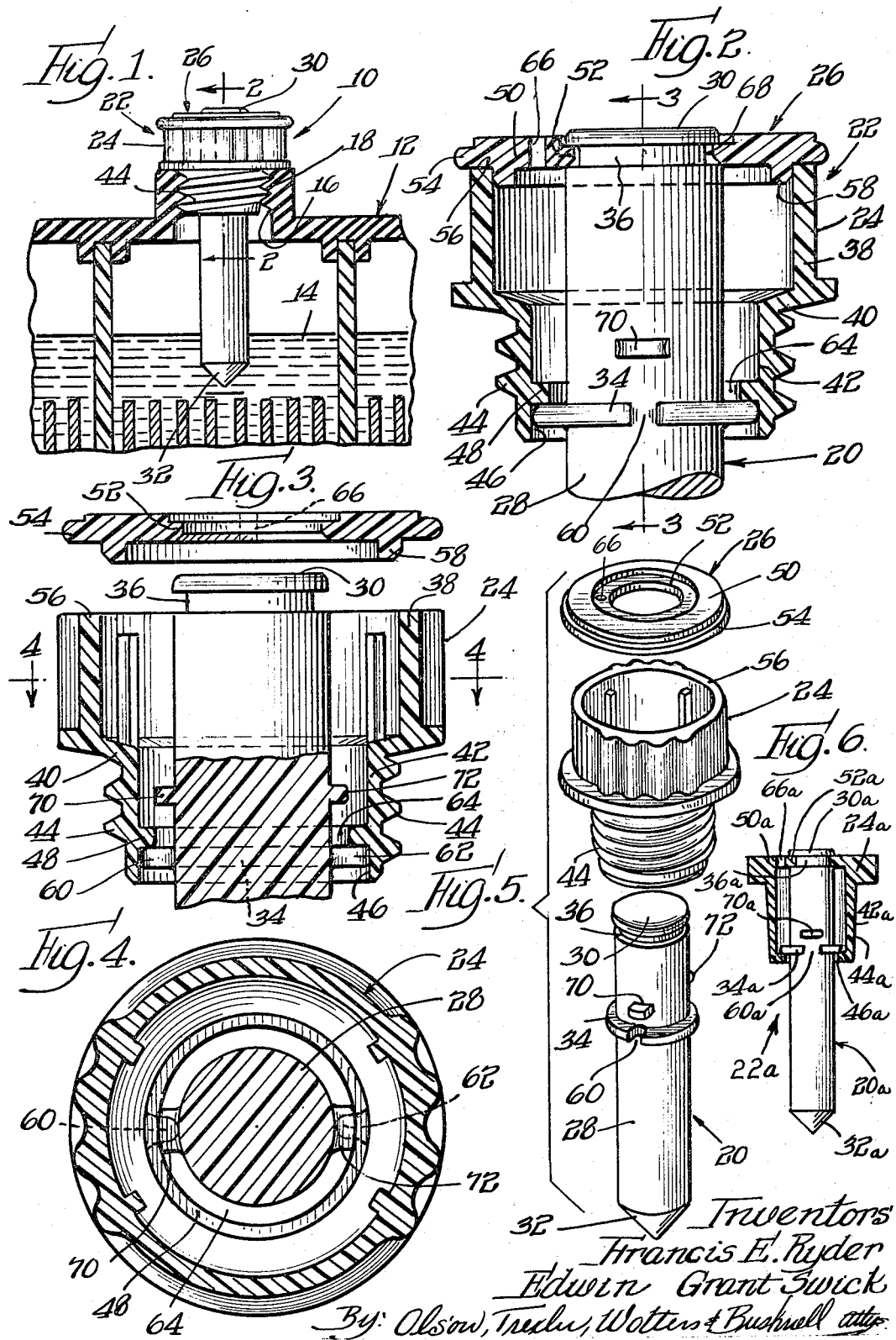

3,383,917
LIQUID LEVEL INDICATOR
Francis E. Ryder and Edwin Grant Swick, Bartlett, Ill., assignors to Illinois Tool Works Inc., Chicago, Ill., a corporation of Delaware
Filed Dec. 8, 1965, Ser. No. 512,480
11 Claims. (Cl. 73—327)

ABSTRACT OF THE DISCLOSURE

There is disclosed a liquid level indicator comprising a rod-like body member of light transmitting material and hollow cap means connected with the rod-like body member for mounting purposes. Interengaging annular flange means on the cap and on the rod have venting openings formed therethrough; and a deflector element is formed integrally with the rod-like body member in alignment with and axially offset from the innermost vent opening for deflecting any liquid which may splash through such opening.

---

The present invention relates to a novel device for providing a visually observable indication of the level of a liquid within a container.

While liquid level indicators incorporating features of the present invention may be adapted for use in a variety of installations, such indicators are especially suitable for assembly with storage batteries in order to enable the level of the electrolyte within the batteries to be checked without removing the battery caps as is usually done in a known manner. The present invention contemplates a level indicating device which may be used with available or standard batteries and the like and more particularly it is contemplated that level indicating devices of the present invention may be installed in place of battery caps and the like heretofore generally used. Such heretofore used battery caps are a relatively simple and inexpensive portion of the battery and it is highly desirable that the indicating devices be constructed so that the overall cost of the battery is not unduly increased. Furthermore, as is known, gases and vapors may be generated within the cells of the storage battery and vents for such gases and vapors have been provided in the battery caps. Thus it is desirable that the level indicating devices of the present invention incorporate means for venting the interior of the storage batteries.

An important object of the present invention is to provide a novel liquid level indicator which is of economical construction and may be easily assembled.

A further object of the present invention is to provide a novel level indicator device which may be installed in a storage battery or other desired container in place of a filling cap or the like previously used with such storage battery or other container.

Still another object of the present invention is to provide a novel level indicator device adapted to be installed in an opening in a container for closing the container while venting the interior thereof, which device is constructed for facilitating assembly while minimizing any possibility of the escape of liquid through venting passageway means thereof.

Other objects and advantages of the present invention will become apparent from the following description and the accompanying drawings wherein:

FIG. 1 is a partial sectional view showing a level indicator device incorporating features of the present invention assembled with a container such as a storage battery;

FIG. 2 is an enlarged fragmentary partial sectional view taken along line 2—2 in FIG. 1;

FIG. 3 is an exploded fragmentary and partial sectional view taken along line 3—3 in FIG. 2;

FIG. 4 is a sectional view taken along line 4—4 in FIG. 3;

FIG. 5 is an exploded perspective view showing elements of the liquid level indicator device of FIGS. 1 through 4; and FIG. 6 is a partial sectional view showing a liquid level indicator device incorporating a modified form of the present invention.

Referring now more specifically to the drawings wherein like parts are designated by the same numerals throughout the various figures, a liquid level indicator device 10 incorporating features of the present invention is shown in FIGS. 1 through 5. While, as previously indicated, the device 10 may be adapted for use in a variety of installations, the device is shown assembled with a storage battery 12 in FIG. 1 for the purpose of illustrating one preferred embodiment.

The storage battery is adapted to contain a quantity of liquid electrolyte 14 therein and is provided with a filling opening 16 defined by internal helical threads 18. The device 10 is adapted to be inserted into the filling opening 16 as shown in FIG. 1. The storage battery 12 is of known construction and need not be further described in detail.

The device 10 comprises an indicator member or rod 20 formed from a light transmitting material such as an acrylic, glass, styrene, or other suitable material. The material may be clear but is preferably at least lightly colored. The member or rod 20 is assembled with and retained by cap means 22 comprising a main body member 24 and a supplemental closure or cover disc member 26. The rod or indicator member 20 may be easily and economically molded from any of the aforementioned suitable materials. The members 24 and 26 also may be easily and economically molded from plastics or other suitable materials.

The indicator member or rod 20 has an elongated cylindrical body 28. The cylindrical body 28 has an outer end surface 30 and an inner end reflecting surface 32. The indicator member or rod 20 is mounted in the cap means 22 in a manner such that the outer end surface 30 is exposed for enabling external light rays from the sun or artificial sources to enter the member through the surface 30. The member 20 is also assembled with the cap means 22 in the manner described more in detail below so that the inner end or reflecting surface 32 will be located within the battery 12 at a desired predetermined minimum level for the electrolyte.

When the device 10 is assembled with the battery as shown in FIG. 1, light rays intersecting the surface 30 pass along the length of the body member 28 in a direction depending on the angular relationship between such light rays and the surface 30. As will be understood, the material of the body member 28 has an index of refraction such that a portion of the light rays striking the surface 30 from above are directed through the body member 28 until they strike the surface 32. A portion of such light rays may be reflected back and forth between the generally cylindrical side surface of the body 28 before intersecting the surface 32 while other of such light rays may pass directly between the outer end surface 30 and the inner end or reflecting surface 32.

In general, a light ray, when striking either the side surface of the cylindrical body member or the inner or reflecting end surface 32 will be reflected back into the body member as long as such surface is exposed to the air and as long as there is a substantial angle of incidence between the direction of the light ray and the surface which it strikes, and more particularly as long as the angle of incidence is in excess of a known critical angle. In any event, the function is such that when the side and inner end or reflecting surfaces of the body member 28 are exposed to the air, a major portion of the light rays entering the upper end surface 30 is directed to and reflected back from the surface 32 and toward the outer end surface 30 along a path of travel such that they strike the surface 30 and pass out from the upper end of the body member 28 so that they may be observed and so that the upper end surface 30 appears to be "light." When, however, the lower end surface 32 of the body member 28 is immersed in liquid as shown in FIG. 1, most of the light rays intersecting the surface 32 pass through the surface and into the liquid. In other words, the light rays are not reflected back toward the outer end of the body member so that the outer end surface 30 appears dark. Thus when the outer end surface 30 appears dark, the device indicates to an observer that the inner end is immersed in the liquid or, in other words, the electrolyte 14 in the battery is above a predetermined desired level. When the electrolyte 14 falls below the desired level so as to expose the surface 32 the outer end of the device appears lighted.

In order to adapt the indicator member or rod 20 for connection with the cap means in the manner described below, a substantially annular flange or shoulder 34 is formed integrally with the body 28. In addition, an annular groove 36 is shown formed in the body adjacent to and spaced slightly axially inwardly from the outer end surface 30 and to provide shoulder means engageable with an annular flange portion of the cap means in a manner hereinafter set forth, but it is to be understood that the groove could be replaced by an annular shoulder providing a flange similar to the flange 34, if desired.

The main body member 24 of the cap means is of hollow construction for conserving material and has a first relatively large diameter outer end section 38 which may be easily grasped during assembly of the cap means with or the removal of the cap means from the battery. The outer end section is joined by an integral inwardly projecting flange or connecting section 40 with a reduced diameter cylindrical inner end section 42 having helical external threads 44 formed thereon. The threads 44 are adapted to be turned into the helical threads 18 of the battery for securing the cap means with respect to the battery.

In the preferred illustrated embodiment the diameter of the inner end section 42 of the cap member 24 is substantially less than the diameter of the outer end section 38 and at the same time is substantially greater than the diameter of the rod-like body member 28. Thus an outer end portion of the rod-like body member above the flange 34 is adapted to project freely through the cap body member 24. As shown best in FIGS. 2 and 3, the external diameter of the annular flange 34 of the rod-like indicator member 20 is similar to the diameter of an internal wall or surface 46 of an innermost end portion of the externally threaded section 42. Thus, when the cap means body member 24 and the rod-like indicator member are assembled together, the flange 34 is adapted to fit within the internal surface or wall 46 as shown in the drawings. A radially inwardly projecting flange 48 is formed integrally with the cylindrical section 42 for overlying and engaging the flange 34 so that the flanges 34 and 48 provide interengaging stop means or shoulders preventing axial relative movement between the rod member and the body member 24 in one direction. It is contemplated that the internal diameter of the cap means 22 may be uniform throughout as distinguished from the illustrated arrangement.

The closure or cover disc member 26 of the cap means comprises an annular disc element or outer body means end portion 50 having an inner marginal or flange portion 52 adapted to be snapped into the groove 36 in the rod-like indicator member or to interengage with a flange on the rod in the event the groove is replaced by such a flange as in the manner indicated above. In any event, the marginal flange portion 52 provides shoulder means for interengaging with radially projecting shoulder means on the rod provided either by the groove or by a flange substituted for the groove. A peripheral portion 54 of the element or disc member 50 projects for engaging an upper end edge 56 of the body member 24. The peripheral portion may be flat as shown or may be in the form of an axially extending cylindrical section similar to the section 38, if desired. The interengagement of the rod-like indicator member and the member 26 functions in combination with the interengagement of the aforementioned flanges 34 and 48 to lock the rod against axial relative movement with respect to the cap means.

A depending annular flange 58 is formed on the cover or closure member 26 with an exterior diameter substantially the same as the internal diameter of the outer end section 38. The flange 58 fits snugly within the outer end section 38 for maintaining the closure or end member 26 and the rod-like indicator member substantially in axial alignment with the main cap means body member 24. If desired the flange 58 could be formed so as to fit around rather than within the section 38.

In order to permit gases, vapors and the like to escape from the interior of the battery, vent passageway means is provided through the cap means 22. This passageway means comprises one or more apertures or notches 60 and 62 formed in the flange 34. The internal diameter of the flange 48 is, as shown best in FIGS. 2, 3 and 4, substantially greater than the diameter of the rod-like body 28 so that an annular passageway 64 is provided between the flange 48 and the rod-like body. It is clear that the portion of the aforementioned passageway means provided by the notches or apertures 60 and 62 communicates with the annular passageway 64 which in turn communicates with the interiors of the hollow sections 42 and 38. A discharge opening for the passageway means is provided through the cap or closure member 26 by one or more apertures 66 and/or, in some instances, by a clearance 68 between the inner marginal portion 52 of the closure member and the rod-like indicator member.

It has been found under certain conditions, liquid or foam normally within the interior of the battery 12 may tend to be splashed or otherwise projected through the notches or openings 60 and 62 in the flange 34 and the passageway means in the cap body member 24. In order to minimize any possibility of such splashing liquid or foam from reaching or passing through the discharge opening 66, deflecting or baffle elements 70 and 72 are provided in alignment with the openings or notches 60 and 62. More specifically, the elements 70 and 72 are formed integrally with the rod-like indicator member 20 so as to be in alignment with the notches or openings. This feature enables the rod-like indicator member and the separate parts of the cap means to be assembled with each other without requiring care to be taken to orient the parts in any particular manner as far as the relationship between the discharge opening 66 and the inlet openings 60 and 62 of the vent passageway means are concerned. Furthermore, as previously indicated, the parts are retained in assembled relationship without the use of adhesives or any auxiliary fastening devices and as a result relative rotation between the parts may take place, but the aforementioned arrangement of the baffle or deflector elements 70 and 72 substantially precludes the splashing or escape of foam or liquid even in the event the parts are rotated so as to align the discharge opening 66 with one of the inlet openings 60 or 62.

As shown in the drawings, the baffle or deflector elements 70 and 72 are not only in alignment with the notches or openings 60 and 62, but are also formed with a width substantially greater than the width of the notches or openings in the direction circumferentially of the rod-like indicator member and a radial extent which is similar to the radial extent of the annular passageway portion 64. In other words, the diameter of an imaginary circle containing the end edges of the elements 70 and 72 is similar to the internal diameter of the flange 48 so that the elements 70 and 72 may be inserted through the flange 48 while still being effective for deflecting any liquid or foam passing upwardly through the slots or openings 60 and 62. While the elements 70 and 72 are in close proximity to the notches or openings, they are spaced axially above the openings and above the flange 48 at a position within the reduced diameter section 42 of the cap member 24. The arrangement is such that the elements 70 and 72 are effective for deflecting any foam or liquid passing through the notches or openings 60 and 62. This deflection serves to reduce to a minimum the possibility of liquid or foam splashing outwardly through the discharge opening 66. It should be understood that recesses or openings corresponding with the openings 60 and 62 could be incorporated in the flange 48 and the flange 34 eliminated, provided the internal diameter of the flange 48 approximated the diameter of the rod 20. The liquid deflecting elements 70 and 72 would cooperate with the openings in the flange 48 in the same manner as such elements cooperate with the openings in the flange 34.

FIG. 6 shows a modified embodiment of the present invention which is similar to the structure described above as indicated by the application of identical reference numerals with the suffix $a$ added to corresponding elements. This embodiment differs in that the main body and cover portions of the cap means 22a are integrally molded or formed on one piece and in that the inner end section 42a is formed with a smooth sealing surface 44a rather than with helical thread convolutions. Such a one-piece cap member may be easily and economically molded for use in situations where it is unnecessary to utilize helical thread convolutions for securing the cap member within an opening in a battery or other container.

While preferred embodiments of the present invention have been shown and described herein, it is obvious that many structural details may be changed without departing from the spirit and scope of the appended claims.

The invention is claimed as follows:

1. A liquid level indicator comprising a rod-like body member of light transmitting material having an outer end and an inner end, shoulder means on and extending substantially around said rod-like body member for cooperative engagement with means for mounting said rod-like body member, said shoulder means being spaced substantially inwardly from said outer end, vent aperture means through said shoulder means, and a deflector element fixedly joined to said rod-like body member in alignment with and axially offset from said vent aperture means toward said outer end for deflecting any liquid or the like which may splash through said vent aperture means when said body member is mounted in position for indicating the level of a liquid.

2. A liquid level indicator, as defined in claim 1, wherein said shoulder means comprises an annular flange, said vent aperture means comprises a plurality of notches in and spaced around said flange, and said indicator includes a plurality of said deflector elements respectively aligned with each of said notches and offset from said flange toward the outer end of said body member.

3. A liquid level indicator, as defined in claim 1, wherein said rod-like body member comprises a generally flat outer end surface and a substantially conical inner end reflecting surface.

4. A liquid level indicator comprising a rod-like body member of light transmitting material having an outer end and an inner end, cap means interconnected with said rod-like body member for supporting said member, said cap means comprising a hollow body member having an outer end portion and an inner end portion, said rod-like body member extending substantially through said hollow body member, annular flange means extending inwardly from said inner end portion and engaging and restraining the rod-like body member against axial movement, said rod-like body member including shoulder means engaging said flange means, said cap means further comprising an annular disc member separate from and engageable with and extending inwardly from said outer end portion of the hollow body member, said disc member including inner-marginal means engaging and restraining said rod-like body member adjacent the outer end thereof, said disc member and said hollow body member including interengaging opposite generally axially and radially facing surface means positioning and restraining said members with respect to each other, vent aperture means through said annular flange means, and complementary vent aperture means through one of said cap means members adjacent an outer end of said cap means.

5. A liquid level indicator comprising a rod-like body member of light transmitting material having an outer end and an inner end, cap means interconnected with said rod-like body member for supporting said member, said cap means comprising a hollow body member having an outer end portion and an inner end portion, said rod-like body member extending substantially through said hollow body member, said hollow body member including annular flange means extending inwardly from said inner end portion and engaging and restraining the rod-like body member, vent aperture means through an inner margin of said annular flange means, means on said rod-like body member extending at least partially over said vent aperture means for restricting the same, said cap means further comprising an annular disc member extending inwardly from an outer end portion of said hollow body member and engaging and restraining said rod-like body member adjacent the outer end thereof, and additional vent aperture means through one of said cap means members adjacent an outer end of the cap means.

6. A liquid level indicator comprising a rod-like body member of light transmitting material having an outer end and an inner end, cap means interconnected with said body member for supporting the same, said cap means comprising a hollow body member including an outer end portion having relatively large internal and external diameters substantially greater than said rod-like body member and an inner end portion of substantial axial length and having relatively small internal and external diameters, said inner end portion defining a narrow annular passageway around said rod-like body member and said outer end portion defining a relatively wide annular passageway around said rod-like body member and communicating with said narrow annular passageway, interengaging annular flange means extending between and connected with said body members within said inner end portion, said flange means having a vent aperture therethrough communicating with said narrow annular passageway, deflector means located within said hollow body member in alignment with said vent aperture means for restricting fluid passing upwardly through said vent aperture means, and said cap means including an annular upper end disc member extending between said upper end portion and said rod-like body member, said disc member having vent aperture means therethrough communicating with said relatively wide annular passageway.

7. A liquid level indicator comprising a rod-like body member of light transmitting material having an outer end and an inner end, cap means interconnected with said rod-like body member for supporting said member, said cap means comprising a hollow body member having an outer end portion and an inner end portion, said rod-like body member extending substantially through said hollow body member, interengaging annular flange means extending between said inner end portion and said rod-like body member and restraining the rod-like body member, vent aperture means through said annular flange means, said cap means further comprising an annular disc member extending inwardly from an outer end portion of said hollow body member and engaging and restraining said rod-like body member adjacent the outer end thereof, additional vent aperture means through one of said cap means members adjacent an outer end of the cap means, said hollow body member providing a passageway between said first mentioned and second mentioned vent aperture means, and deflector means disposed within said hollow body member and partially traversing said passageway for restricting the same.

8. A liquid level indicator, as defined in claim 7, wherein said flange means comprises a generally annular flange on each of said body members disposed adjacent said inner end portion.

9. A liquid level indicator, as defined in claim 8, wherein said first mentioned aperture means is in the flange means on the rod-like body member, and said deflector element is fixedly joined to said rod-like body member.

10. A liquid level indicator, as defined in claim 8, wherein said disc member is separate from said hollow body member and includes a peripheral marginal portion engaging said hollow body member, said rod-like body member including shoulder means adjacent said disc member, and said disc member including an annular inner marginal portion engageable with said shoulder means.

11. A liquid level indicator, as defined in claim 8, wherein said disc member is integrally formed with said hollow body member and includes an annular inner marginal portion closely surrounding said rod-like body member, and shoulder means on said rod-like body member engaging said annular inner marginal portion.

References Cited
UNITED STATES PATENTS

| | | | |
|---|---|---|---|
| 1,883,971 | 10/1932 | Kryzanowsky | 73—327 |
| 1,938,989 | 12/1933 | Woodbridge | 136—182.1 X |
| 2,368,705 | 2/1945 | Dupont et al. | 73—327 |
| 2,554,557 | 5/1951 | Brown et al. | 73—327 |
| 2,590,960 | 4/1952 | Gray | 136—182.1 X |
| 3,228,288 | 1/1966 | Marien | 240—1 |

DAVID SCHONBERG, *Primary Examiner.*

LOUIS R. PRINCE, *Examiner.*

D. M. YASICH, *Assistant Examiner.*